United States Patent
McGrogan et al.

(10) Patent No.: US 8,777,803 B2
(45) Date of Patent: Jul. 15, 2014

(54) METHOD OF PRIORITIZING OUTPUT TORQUE AND OFF-GOING CLUTCH TORQUE CONSTRAINTS DURING A TORQUE PHASE

(75) Inventors: Sean W. McGrogan, Ann Arbor, MI (US); Anthony H. Heap, Ann Arbor, MI (US); Lawrence A. Kaminsky, White Lake, MI (US); Pinaki Gupta, Wixom, MI (US)

(73) Assignee: GM Global Technology Operations LLC

( * ) Notice: Subject to any disclaimer, the term of this patent is extended or adjusted under 35 U.S.C. 154(b) by 532 days.

(21) Appl. No.: 13/198,033

(22) Filed: Aug. 4, 2011

(65) Prior Publication Data

US 2012/0303191 A1 Nov. 29, 2012

Related U.S. Application Data

(60) Provisional application No. 61/489,873, filed on May 25, 2011.

(51) Int. Cl.
*B60W 10/06* (2006.01)
*B60W 10/08* (2006.01)

(52) U.S. Cl.
USPC .................... 477/3; 477/107; 701/22; 701/54

(58) Field of Classification Search
USPC ............ 477/3, 5, 107; 701/22, 54; 180/65.28, 180/65.285
See application file for complete search history.

(56) References Cited

U.S. PATENT DOCUMENTS

| | | | |
|---|---|---|---|
| 4,185,521 A | 1/1980 | Beals | |
| 5,090,511 A | 2/1992 | Kabasin | |
| 6,012,676 A | 1/2000 | Gold et al. | |
| 6,910,990 B2 | 6/2005 | Doering et al. | |
| 7,219,000 B2 | 5/2007 | Steinmetz et al. | |
| 7,503,875 B2* | 3/2009 | Fujii et al. | 477/107 |
| 8,265,815 B2 | 9/2012 | McGrogan et al. | |
| 8,527,128 B2* | 9/2013 | Morimura | 701/22 |
| 2004/0259684 A1 | 12/2004 | Kresse et al. | |
| 2005/0256623 A1 | 11/2005 | Hubbard et al. | |
| 2006/0175997 A1 | 8/2006 | Hommi et al. | |
| 2009/0233758 A1* | 9/2009 | Soliman et al. | 477/3 |
| 2010/0222953 A1* | 9/2010 | Tang | 701/22 |
| 2011/0125352 A1 | 5/2011 | McGrogan et al. | |
| 2013/0030626 A1* | 1/2013 | Patel et al. | 701/22 |

OTHER PUBLICATIONS

U.S. Appl. No. 12/625,604, filed Nov. 25, 2009, Sean W. McGrogan.

* cited by examiner

*Primary Examiner* — Roger Pang

(57) ABSTRACT

A system for a vehicle includes a constraint module that generates a plurality of constraints. An output torque module generates a commanded output torque based on a torque request and the plurality of constraints. A split torque module determines a first torque and a second torque to be applied to a transmission of the vehicle based on the plurality of constraints and the commanded output torque. A first one of the plurality of constraints corresponding to a first clutch is adjusted from a first range of values to a second range of values that is different from the first range of values in response to a command to offload the first clutch.

22 Claims, 4 Drawing Sheets

METHOD OF PRIORITIZING OUTPUT TORQUE AND OFF-GOING CLUTCH TORQUE CONSTRAINTS DURING A TORQUE PHASE

CROSS-REFERENCE TO RELATED APPLICATIONS

This application claims the benefit of U.S. Provisional Application No. 61/489,873, filed on May 25, 2011. The disclosure of the above application is incorporated herein by reference in its entirety.

FIELD

The present disclosure relates to transmissions and, more particularly to shift control systems and methods for improved shift time.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transmission may receive input torque from an engine of a vehicle and/or one or more electric motor/generators (e.g. in a hybrid vehicle) and provides output torque to a driveline. For example, the transmission selects between various gear configurations (i.e., shifts) to provide a particular output torque to the driveline in response to the input torque.

The transmission includes one or more clutches. The clutches selectively engage and disengage input and output shafts of the transmission to manage rotational speed and torque differences between the shafts. The transmission actuates the clutches to perform a shift between gear configurations (i.e. to provide a desired gear ratio).

Shifting from one gear ratio to another typically includes releasing (i.e. disengaging) an off-going clutch or clutches associated with a current gear ratio, applying (i.e. engaging) an on-coming clutch or clutches associated with the desired gear ratio, and/or maintaining one or more currently engaged clutches. For example, a shift may be executed by deactivating a single off-going clutch, activating a single on-coming clutch, and in some cases holding (i.e. maintaining) a third clutch for both the current and desired gear ratios. In other arrangements, multiple on-coming and\or off-going clutches may be actuated.

SUMMARY

A system for a vehicle includes a constraint module that generates a plurality of constraints. An output torque module generates a commanded output torque based on a torque request and the plurality of constraints. A split torque module determines a first torque and a second torque to be applied to a transmission of the vehicle based on the plurality of constraints and the commanded output torque. A first one of the plurality of constraints corresponding to a first clutch is adjusted from a first range of values to a second range of values that is different from the first range of values in response to a command to offload the first clutch.

A method for operating a transmission of a vehicle includes generating a plurality of constraints, generating a commanded output torque based on a torque request and the plurality of constraints, determining a first torque and a second torque to be applied to a transmission of the vehicle based on the plurality of constraints and the commanded output torque, and adjusting a first one of the plurality of constraints corresponding to a first clutch is from a first range of values to a second range of values that is different from the first range of values in response to a command to offload the first clutch.

A method for operating a transmission of a vehicle includes generating a plurality of torque constraints, generating a commanded output torque based on a torque request and the plurality of torque constraints, and determining a first torque and a second torque to be applied to a transmission of the vehicle based on the plurality of torque constraints and the commanded output torque. A first one of the plurality of torque constraints corresponding to a first clutch is adjusted from a first range of values to a second range of values that is different from the first range of values in response to a command that offloads the first clutch.

Further areas of applicability of the present disclosure will become apparent from the detailed description provided hereinafter. It should be understood that the detailed description and specific examples are intended for purposes of illustration only and are not intended to constrain the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
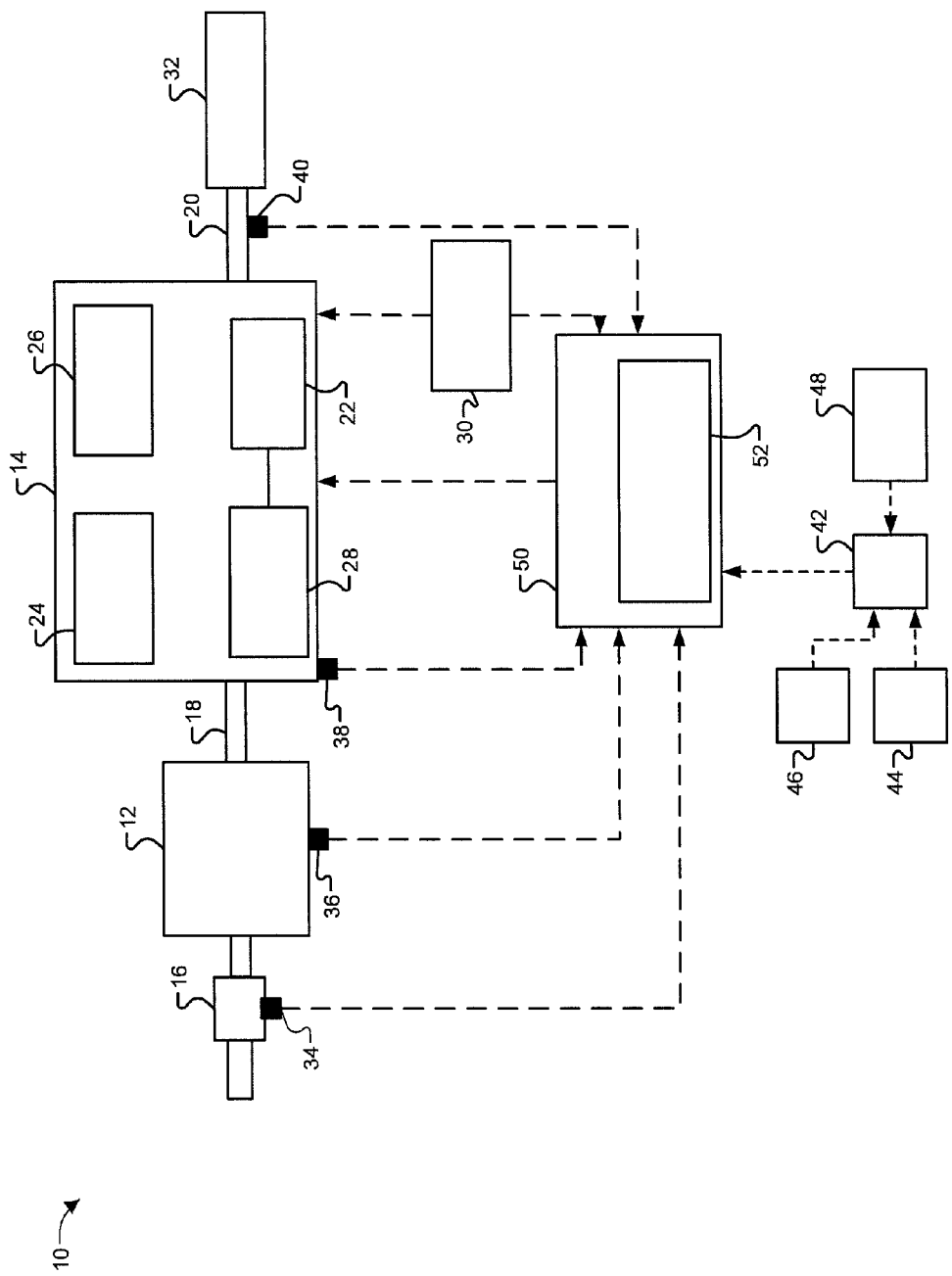
FIG. 1 is a functional block diagram of a vehicle system according to the present disclosure.

The following description is merely illustrative in nature and is in no way intended to constrain the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

Shifting between gear configurations in a transmission includes a torque phase. During the torque phase, the off-going clutch is offloaded and released. The oncoming clutch is synchronized and locked, and then is loaded at a controlled rate. The rate is a function of a relationship between an output torque of the transmission and a reactive torque of the off-going clutch. In particular, the output torque may be dependent upon the reactive torque of the off-going clutch. A shift control module of the present disclosure determines when the torque phase may offload the off-going clutch as quickly as possible without changing a commanded output torque. For example, when the output torque is less dependent on the reactive torque of the off-going clutch, the shift control module may offload the clutch (e.g. using one or more electric motor/generators) at a faster rate, thereby reducing shift time, improving drivability, and improving fuel economy.

Referring now to FIG. 1, a vehicle 10 includes an engine 12 that provides torque to a transmission 14. Air is drawn into the engine 12 through a throttle 16. The air is mixed with fuel and combusted within cylinders (not shown) of the engine 12 to produce engine torque. The engine 12 provides the engine torque to the transmission 14 via a transmission input shaft 18. The transmission 14 may be a multi-speed automatic clutch-to-clutch transmission that drives a transmission output shaft 20 based on the engine torque.

The transmission 14 includes gear elements 22, drive elements of motor/generators 24 and 26, and friction elements, such as, for example only, clutches 28. One or more of the motor/generators 24, 26 may be grounded. The motor/generators 24, 26 produce a torque a (Ta) and a torque b (Tb), respectively. The torques Ta and Tb together correspond to an output torque. A battery 30 provides electrical power to the motor/generators 24, 26.

The transmission output shaft 20 drives a driveline 32 of the vehicle 10. The speed and torque relationships between the engine 12 and the driveline 32 are controlled by engaging the gear elements 22 to selected ones of the clutches 28. The clutches 28 are selectively engaged to provide, for example only, neutral, a plurality of forward gear ratios, and one reverse gear ratio.

A plurality of sensors monitor respective engine operating conditions. The plurality of sensors include, but are not limited to, a throttle position sensor 34, an engine speed sensor 36, motor speed sensors 38, and a transmission output speed sensor 40. The throttle position sensor 34 measures a throttle position (which corresponds to a throttle opening). The throttle opening determines air flow into the engine 12. The engine speed sensor 36 measures engine speed. The motor speed sensors 38 measure the motor speed (e.g. output rotational speed) of the motor/generators 24, 26. The transmission output speed sensor 40 measures a rotational speed of the transmission output shaft 20.

A user interface (UI) 42 is operatively connected to a plurality of devices through which a vehicle operator controls or directs operation of the vehicle 10. Input devices include an accelerator pedal 44 from which an operator torque request is determined and operator break pedal 46, a transmission gear selector 48, and a vehicle speed cruise control (not shown). The gear selector 48 may have a discrete number of operator-selectable positions, including a forward position and a reverse position to select the rotational direction of the output shaft 20 in a forward and a reverse direction, respectively.

A control module 50 receives signals from the plurality of sensors and controls the engine 12 and transmission 14 accordingly. The control module 50 includes a shift control module 52 that controls execution of a shift. Based on a plurality of torque and power (e.g., battery, power) constraints and a corresponding torque split, the shift may execute rapidly or respond to gradual modification to the torque split before shifting. The shift control module 42 determines the torque split based on the constraints in a prioritized order, and controls a rate at which an off-going one of the clutches 28 is offloaded based on the constraints, the torque split, a dependence of output torque on offgoing clutch torque, and the prioritized order. As used herein, torque constraints include, for example only, torque limits (e.g., a pair of torque limits) that indicate estimated torque carrying capabilities of a corresponding one of the clutches 28. The torque limits may include torque pairs corresponding to a minimum torque limit and a maximum torque limit (i.e. a min/max pair). Calculation and application of output torque constraints based on a plurality of component torque constraints are described in U.S. patent application Ser. No. 12/625,604, filed on Nov. 25, 2009, which is hereby incorporated herein in its entirety.

The constraints (e.g., constraints on the output torque) according to the present disclosure may include short term (ST) constraints and long term (LT) constraints. The LT constraints may be calculated based on considerations such as long term component durability, mechanical limitations of the components of the transmission 14, and capabilities of individual components to carry torque. The ST constraints may be calculated based on considerations such as ST power considerations (e.g., ST battery power considerations), ST motor torque considerations, and ST clutch torque limits. For example, the LT constraints may include battery power limits (e.g. a maximum amount of output torque which, on average, may be sustained over a given period of battery use). Sustained battery power in excess of the LT battery power limits may render the battery unable to meet its life target of service (e.g. as measured in months or years). Similarly, the LT constraints may take into account long term needs of other components, such as multiple motor/generators, multiple clutches, and mechanical members transferring torque between components within the transmission 14. Conversely, the ST constraints may represent temporary deviations from (i.e., violations of) the LT constraints that will not degrade the durability and performance of the battery, the motor/generators 24, 26, or the clutches 28 over their respective life cycles. Therefore, the LT constraints may be violated for short periods of time without negatively impacting the long-term durability of the battery or other components of the hybrid transmission, as long as the maximum and minimum ST constraints are not also violated.

Accordingly, during a torque phase of a given shift, the output torque is controlled based on the torque constraints (e.g. constraints on the output torque) and the corresponding torque limits (i.e. the min/max pairs). The shift control module 42 controls the output torque to be between any applicable torque limits during the shift.

Figure 2:
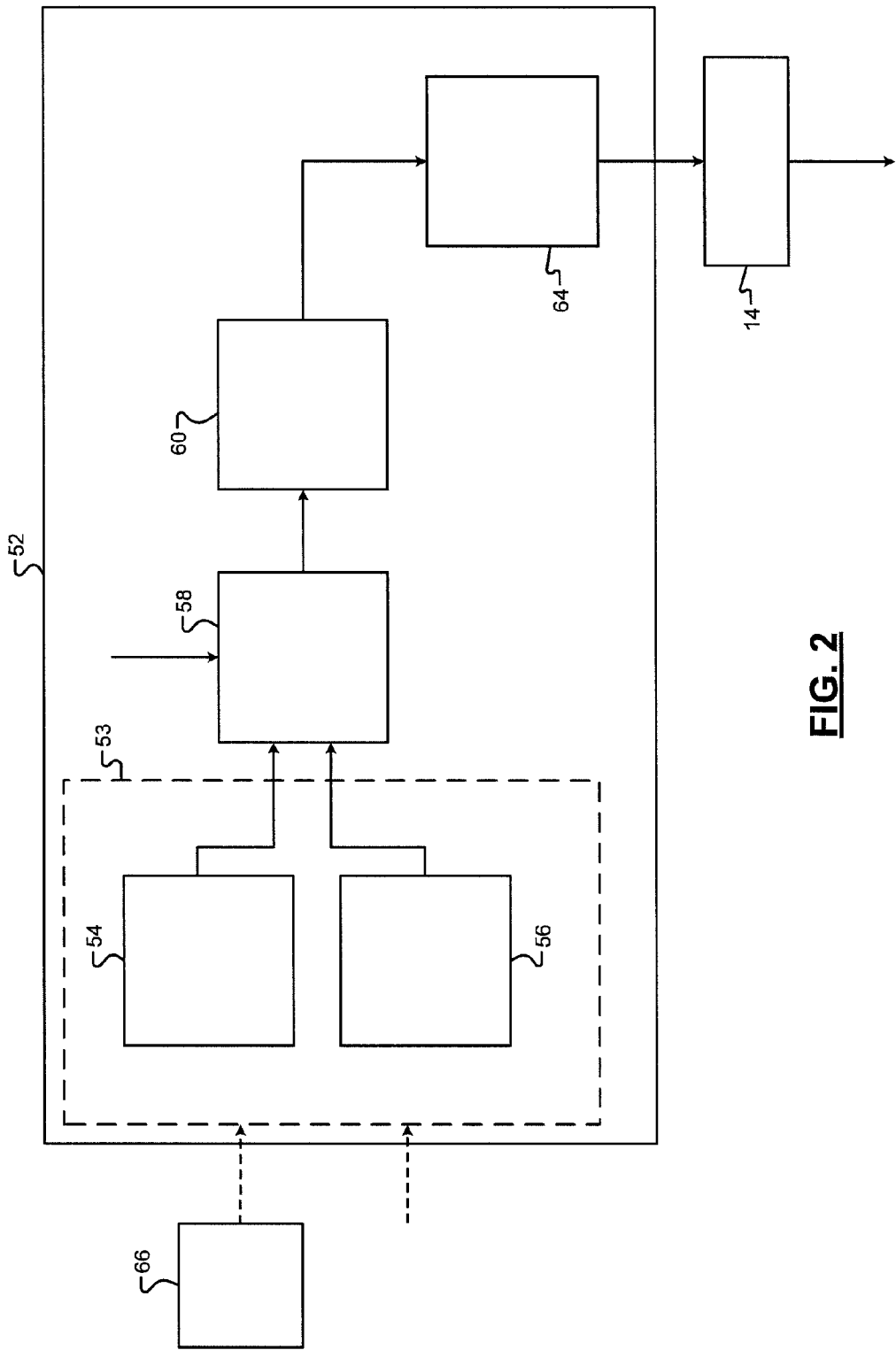
FIG. 2 is a functional block diagram of a shift control module according to the present disclosure.

Referring to FIG. 2, the shift control module 52 includes a constraint module 53 (which includes an ST constraint module 54 and an LT constraint module 56), an output torque module 58, a split torque module 60, and a clutch engagement module 64. The constraint module 53 calculates the torque based on state information (e.g. information associated with current operating states of the vehicle 10, such as a current engine torque, user input, desired acceleration, acceleration of the output shaft 22, engine speed, transmission component speeds, torques on slipping clutches, and fuel usage) and ST and LT torque limits.

For example only, the ST torque limits may correspond to torque limits on torque provided by the motor/generators 24, 26, torque provided by the clutches 28, and an ST battery power limit. Similarly, the LT torque limits may correspond to torque limits on torque provided by the motor/generators 24, 26, torque provided by the clutches 28, and a LT battery power limit. The ST constraint module 54 calculates ST output torque constraints based on the ST torque limits, the LT output torque limits, and the state information. The LT constraint module 56 calculates LT output torque constraints based on the LT torque limits, the ST torque limits, and the state information. For example only, nonvolatile memory 66 may store the ST and LT constraints. The nonvolatile memory 66 may store a table of the ST output torque limits and the LT output torque limits. The table of the ST output torque limits and the LT output torque limits may be indexed based on various operating conditions of the vehicle, including the state information.

The output torque module 58 arbitrates between the ST and LT output constraints to determine the final torque constraints to be applied to an output torque request. The output torque module 58 applies the final constraints to the output torque request. The output torque module 58 filters and/or rate limits the output torque request for various drivability reasons such as driveline lash management, and reapplies the final constraints to determine a commanded output torque. The output torque module 58 outputs the commanded output torque to the split torque module 60.

The split torque module 60 receives the commanded output torque and determines a combination of the torques Ta and Tb (output by the motor/generators 24, 26, respectively) that will produce the commanded output torque. For example, applying the constraints to one of the torques Ta and Tb constrains both of the torques Ta and Tb. For example, one of the torques Ta and Tb may be found using equation (1) when output torque (To) and one of the torques Ta and Tb is known. In equation (1), $C_1$ and $C_2$ are constants related to gearing of the clutches.

$$To = C_1 Ta + C_2 Tb \quad (1)$$

The split torque module 60 determines the torques Ta and Tb based on a predetermined order of priority of the torque constraints. For example only, the order of priority for the constraints is, from lowest to highest priority, an optimal split (e.g. an optimal torque split between the motor/generators 24 and 26 may correspond to the least amount of electrical power loss for a given output torque), first, second, and third LT clutch constraints (i.e. corresponding to shift capacity of first, second, and third ones of the clutches 28), battery power constraints, first, second, and third ST clutch constraints, and torque constraint of the motor/generators 24 and 26.

The split torque module 60 applies the lowest priority constraint (e.g. the optimal split), then the next lowest priority constraint (e.g. the first LT clutch constraint), and sequentially applies the remaining constraints based on the order of priority until applying the highest priority constraint (e.g. the motor/generator 24). Accordingly, each successive constraint may further modify the determined torques Ta and Tb, and application of a higher priority constraint may cause a deviation from a previously applied, lower priority constraint. For example, if a higher priority constraint is more restrictive than a lower priority constraint, the higher priority constraint replaces the minimum or maximum value of lower priority constraint.

During a torque phase of a shift, the shift control module 52 may adjust one or more of the LT constraints determined by the LT constraint module 56. For example, the shift control module 52 may adjust the LT constraint that corresponds to one of the clutches 28 that is being offloaded (i.e. an off-going clutch) in the shift. Specifically, the LT constraint for the off-going clutch may be adjusted to 0 (i.e. a min/max pair of 0/0), which would result in the off-going clutch being offloaded as quickly as possible, pending the application of any ST constraints. In other words, the LT constraint is adjusted such that the off-going clutch is offloaded as quickly as possible (e.g., instantaneously, if possible), unless at least one of the constraints with a higher priority than the LT constraint prohibits motor torque commands that would satisfy the LT constraint. Accordingly, when no off-going clutch torque is required (e.g. by the ST constraint), the off-going clutch is offloaded as quickly as possible. In some vehicles, offloading the off-going clutch in this manner minimizes the amount of time spent fueling the engine 12 while it is disconnected from the transmission 14. Conversely, when the ST constraint for the off-going clutch requires torque, the adjusted LT constraint for the off-going clutch may be violated by the ST constraint.

When applied, the adjusted LT constraint may violate lower priority constraints such as the optimal split torque constraint. The shift control module 52 may determine that violating the lower priority constraint in favor of the higher priority, adjusted LT constraint for the off-going clutch would be unnecessary and increase power loss if the ST constraints ultimately violate the adjusted LT constraint. In other words, if the ST constraint will ultimately violate the adjusted LT constraint, then there may be no need to violate the optimal split torque constraint in favor of the adjusted LT constraint. In this case, shift control module 52 may ignore the adjusted LT constraint.

For example, the split torque module 60 may determine, for a given commanded output torque, first and second separate ranges of constraints for the torques Ta and Tb. For example, the first range of constraints satisfies the battery power constraints, the ST constraints, and the motor/generator torque constraints. The second range of constraints satisfies the LT constraints, including the adjusted LT torque constraint for the off-going clutch. If there is any intersection between the first and second range of constraints (i.e. there exists a range of torques Ta and Tb that satisfy both the first range and the second range), then the split torque module 60 limits the torques Ta and Tb according to first and second ranges of constraints. For example, the torques Ta and Tb may be based on the optimal split modified by the second range of constraints, and then further modified by the first range of constraints. Conversely, if there is no intersection between the first and second range of constraints (i.e. the first range of constraints obviates the second range of constraints), then the split torque module 60 limits the torques Ta and Tb according to only the first range of constraints. For example, the torques Ta and Tb may be based on the optimal split modified by the first range of constraints.

The clutch engagement module 64 generates one or more clutch engagement signals. The clutch engagement signals are estimates of reactive torque carried on each of the locked clutches corresponding to the torques Ta and Tb. The engagement signals direct the transmission 14 to maintain or change the torque capacity of the clutches. For example, a change in hydraulic pressure applied to the clutch 28 may change the torque capacity of the clutch 28. The torque capacity of the clutch 28 corresponds to how much load the clutch 28 can carry.

Figure 3A:
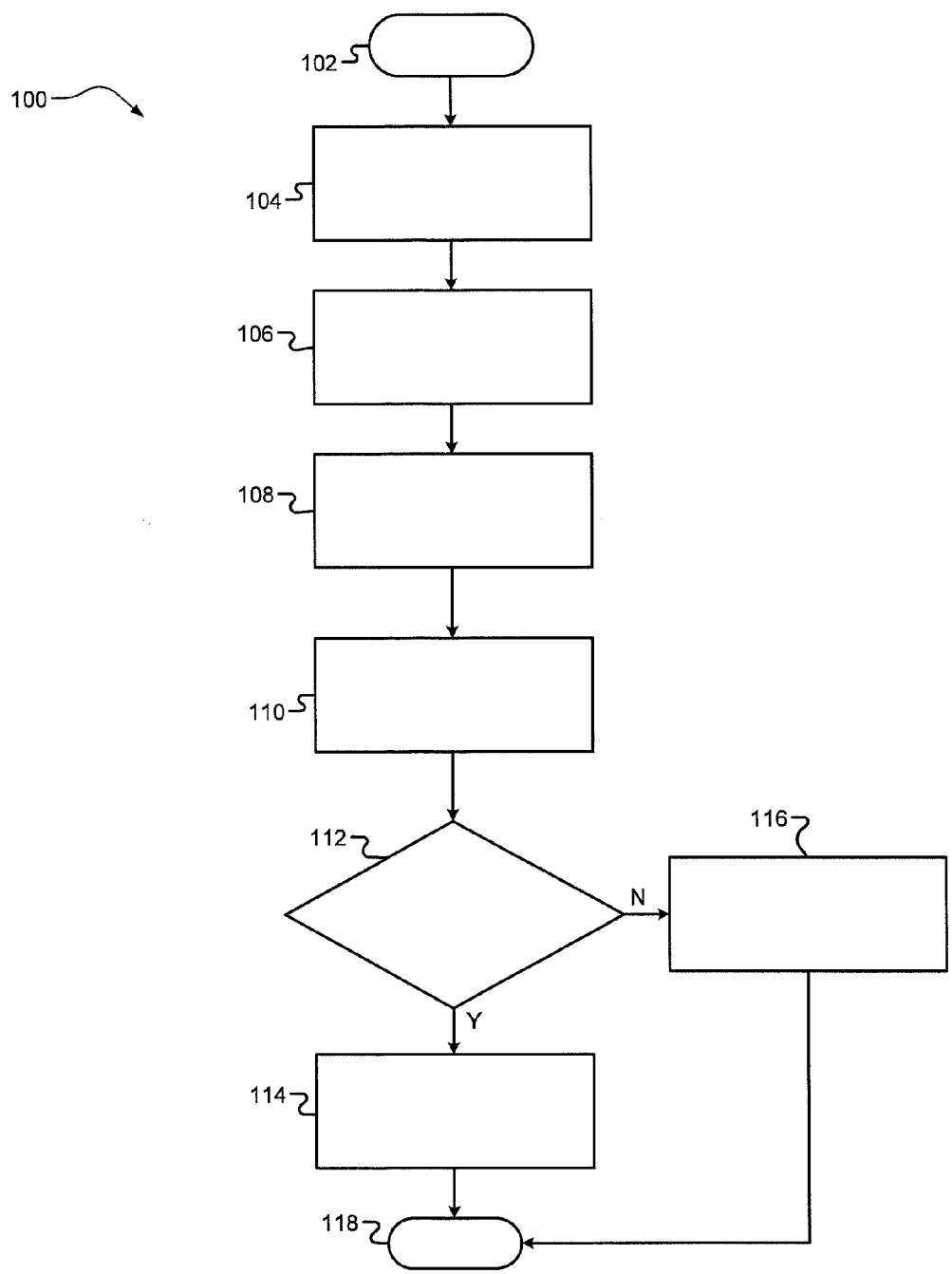
FIGS. 3A and 3B are flow diagrams illustrating shift control methods according to the present disclosure.

Referring now to FIG. 3A, a shift control method 100 begins at 102. At 104, the method 100 calculates the LT constraints. At 106, the method 100 calculates the ST constraints. At 108, the method 100 determines the commanded output torque. At 110, the method 100 determines the torques Ta and Tb. For example, the split torque module 60 determines the torques Ta and Tb based on the LT and ST constraints and their corresponding priorities as described above in FIG. 2. At 112, the method 100 determines whether the clutch reactive torque corresponding to the torques Ta and Tb satisfies the LT constraints to allow the off-going clutch to be offloaded quickly (i.e. determines whether applying the LT constraint for the off-going clutch, modified by the ST constraints, allows the off-going clutch to be quickly offloaded). If true, the method 100 proceeds to 114. If false, the method 100 proceeds to 116. At 114, the offgoing clutch is offloaded and the method 100 commands the transmission to release the offgoing clutch. At 116, the method 100 gradually adjusts output torque as needed according to the constraints having higher priority than LT constraints, thereby offloading the off-going clutch. The method 100 ends at 118.

Figure 3B:
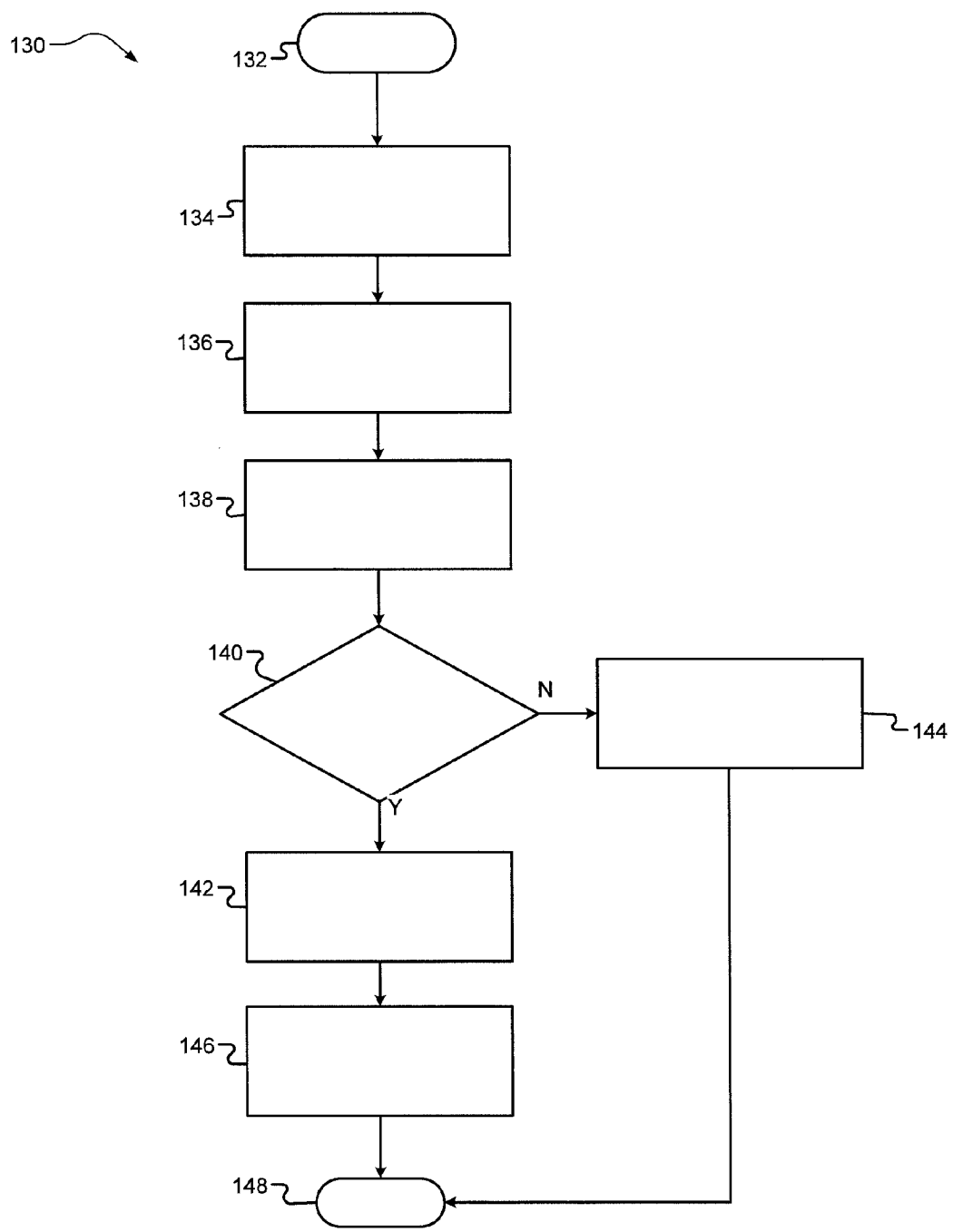

Referring now to FIG. 3B, an alternative shift control method 130 begins at 132. At 134, the method 130 calculates the LT constraints. At 136, the method 130 calculates the ST constraints. At 138, the method 130 determines the commanded output torque. At 140, the method 130 determines if LT constraints and all higher priority constraints can be met. If true, the method 130 proceeds to 142. If false, the method 130 proceeds to 144. At 142, the method 130 determines the torques Ta and Tb based on the LT and ST constraints and their corresponding priorities as described above in FIG. 2. At 146, the offgoing clutch is offloaded and the method 130 commands the transmission to release the offgoing clutch. At 144, the method 130 determines the torques Ta and Tb based on all prioritized constraints except the LT clutch constraints. Accordingly, output torque is gradually adjusted as needed according to the constraints having higher priority than the LT constraints, thereby offloading the off-going clutch. The method 130 ends at 148.

The broad teachings of the disclosure can be implemented in a variety of forms. Therefore, while this disclosure includes particular examples, the true scope of the disclosure should not be so constrained since other modifications will become apparent to the skilled practitioner upon a study of the drawings, the specification, and the following claims.

What is claimed is:

1. A system for a vehicle, the system comprising:
   a constraint module that generates a plurality of constraints;
   an output torque module that generates a commanded output torque based on a torque request and the plurality of constraints; and
   a split torque module that determines a first torque and a second torque to be applied to a transmission of the vehicle based on the plurality of constraints and the commanded output torque,
   wherein a first one of the plurality of constraints corresponding to a first clutch is adjusted from a first range of values to a second range of values that is different from the first range of values in response to a command to offload the first clutch.

2. The system of claim 1 wherein the split torque module sequentially applies the plurality of constraints to the first torque and the second torque based on respective priorities assigned to the plurality of constraints.

3. The system of claim 1 wherein the plurality of constraints further includes a second one of the plurality of constraints corresponding to the first clutch, a battery power constraint, a first motor/generator torque constraint, a second motor/generator torque constraint, and an optimal split torque constraint.

4. The system of claim 3 wherein the plurality of constraints is prioritized from a lowest priority to a highest priority according to: the optimal split torque constraint, the first one of the plurality of constraints, the battery power constraint, the second one of the plurality of constraints, the second motor/generator torque constraint, and the first motor/generator torque constraint.

5. The system of claim 1 wherein the constraint module generates the plurality of constraints based on a plurality of stored torque limits for respective components of the transmission.

6. The system of claim 1 wherein the plurality of constraints includes a first set of torque constraints corresponding to respective clutches and a second set of torque constraints corresponding to the respective clutches, wherein the first set of torque constraints includes the first one of the plurality of constraints.

7. The system of claim 6 wherein the second set of torque constraints has a higher priority than the first set of torque constraints.

8. The system of claim 7 wherein the split torque module selectively disregards the first set of torque constraints based on the second set of torque constraints.

9. The system of claim 1 wherein the commanded output torque is changed at a rate that is based on a relationship between the commanded output torque and a reactive torque of the first clutch.

10. The system of claim 1 wherein the first clutch is offloaded at a rate that is based on a relationship between the commanded output torque and a reactive torque of the first clutch.

11. The system of claim 1 wherein the first clutch is offloaded instantaneously in response to a determination that offloading the first clutch does not require a modification of the commanded output torque.

12. A method for operating a transmission of a vehicle, the method comprising:
   generating a plurality of constraints;
   generating a commanded output torque based on a torque request and the plurality of constraints;
   determining a first torque and a second torque to be applied to a transmission of the vehicle based on the plurality of constraints and the commanded output torque; and
   adjusting a first one of the plurality of constraints corresponding to a first clutch from a first range of values to a second range of values that is different from the first range of values in response to a command to offload the first clutch.

13. The method of claim 12 further comprising sequentially applying the plurality of constraints to the first torque and the second torque based on respective priorities assigned to the plurality of constraints.

14. The method of claim 12 wherein the plurality of constraints further includes a second one of the plurality of constraints corresponding to the first clutch, a battery power constraint, a first motor/generator torque constraint, a second motor/generator torque constraint, and an optimal split torque constraint.

15. The method of claim 14 further comprising prioritizing the plurality of constraints from a lowest priority to a highest priority according to: the optimal split torque constraint, the first one of the plurality of constraints, the battery power constraint, the second one of the plurality of constraints, the second motor/generator torque constraint, and the first motor/generator torque constraint.

16. The method of claim 14 further comprising generating the plurality of constraints based on a plurality of stored torque limits for respective components of the transmission.

17. The method of claim 12 wherein the plurality of constraints includes a first set of torque constraints corresponding to respective clutches and a second set of torque constraints corresponding to the respective clutches, wherein the first set of torque constraints includes the first one of the plurality of constraints.

18. The method of claim 17 wherein the second set of torque constraints has a higher priority than the first set of torque constraints.

19. The method of claim 18 further comprising selectively disregarding the first set of torque constraints based on the second set of torque constraints.

20. The method of claim 12 further comprising changing the commanded output torque at a rate that is based on a relationship between the commanded output torque and a reactive torque of the first clutch.

21. The method of claim 12 offloading the first clutch at a rate that is based on a relationship between the commanded output torque and a reactive torque of the first clutch.

22. The method of claim 12 further comprising offloading the first clutch instantaneously in response to a determination that offloading the first clutch does not require a modification of the commanded output torque.

\* \* \* \* \*